United States Patent
Kim et al.

(10) Patent No.: US 10,241,366 B2
(45) Date of Patent: Mar. 26, 2019

(54) DISPLAY DEVICE AND MANUFACTURING METHOD OF DISPLAY DEVICE

(71) Applicant: Samsung Display Co. Ltd., Yongin-si (KR)

(72) Inventors: Young Gu Kim, Yongin-si (KR); Taek Joon Lee, Hwaseong-si (KR); Baek Kyun Jeon, Yongin-si (KR); Jin Soo Jung, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 176 days.

(21) Appl. No.: 15/467,758

(22) Filed: Mar. 23, 2017

(65) Prior Publication Data

US 2018/0095323 A1  Apr. 5, 2018

(30) Foreign Application Priority Data

Sep. 30, 2016 (KR) .......................... 10-2016-0126446

(51) Int. Cl.
*G02F 1/1335* (2006.01)
*G02F 1/1333* (2006.01)

(52) U.S. Cl.
CPC .................. *G02F 1/133617* (2013.01); *G02F 2001/133357* (2013.01); *G02F 2201/54* (2013.01); *G02F 2202/108* (2013.01)

(58) Field of Classification Search
CPC ... G02F 1/133617; G02F 2001/133357; G02F 1/133512; G02F 1/133528
See application file for complete search history.

(56) References Cited

U.S. PATENT DOCUMENTS

| | | | |
|---|---|---|---|
| 5,986,735 A * | 11/1999 | Komatsu | G02F 1/1337 349/128 |
| 8,377,614 B2 | 2/2013 | Lee et al. | |
| 8,830,429 B2 | 9/2014 | Ishigaki et al. | |
| 9,329,421 B2 | 5/2016 | Lee et al. | |
| 2005/0036089 A1* | 2/2005 | Lyu | G02F 1/13363 349/117 |
| 2015/0109560 A1 | 4/2015 | Guo et al. | |
| 2016/0209717 A1 | 7/2016 | Lee et al. | |
| 2017/0336675 A1* | 11/2017 | Kim | G02F 1/133536 |

FOREIGN PATENT DOCUMENTS

| | | |
|---|---|---|
| JP | 2011059314 | 3/2011 |
| KR | 1020100114280 | 10/2010 |
| KR | 1020110045480 | 5/2011 |
| KR | 1020150021013 | 2/2015 |
| WO | 2015010370 | 1/2015 |

* cited by examiner

*Primary Examiner* — Karabi Guharay
(74) *Attorney, Agent, or Firm* — Cantor Colburn LLP (57) ABSTRACT

A display device includes a first substrate, a wavelength conversion layer disposed on the first substrate, an inorganic film disposed on the wavelength conversion layer, a flattening film disposed on the inorganic film, and a first polarizing layer disposed on the flattening film, where a difference between a coefficient of thermal expansion of the flattening film and a coefficient of thermal expansion of the inorganic film is about 50 ppm/K or less.

20 Claims, 11 Drawing Sheets

DISPLAY DEVICE AND MANUFACTURING METHOD OF DISPLAY DEVICE

This application claims priority to Korean Patent Application No. 10-2016-0126446, filed on Sep. 30, 2016, and all the benefits accruing therefrom under 35 U.S.C. § 119, the content of which in its entirety is herein incorporated by reference.

BACKGROUND

1. Field

Embodiments of the invention relate to a display device and a manufacturing method thereof.

2. Description of the Related Art

The demand for display devices is increasing with the development of multimedia. Accordingly, various types of display device, such as a liquid crystal display and an organic light emitting display, are widely used in recent times.

Among such various types of display device, the liquid crystal display device, which is one of the most widely used types of flat panel display device, typically includes two substrates on which field generating electrodes such as pixel electrodes and common electrodes are provided, and a liquid crystal layer interposed therebetween. The liquid crystal display device displays an image, by applying a voltage to the field generating electrode to generate an electric field in a liquid crystal layer, by determining the direction of liquid crystal molecules of the liquid crystal layer through the electric field, and thereby by controlling the polarization of the incident light.

Each pixel of the liquid crystal display device may display one of the primary colors to achieve a color display. In the liquid crystal display device, a color filter for each pixel may be disposed on an optical path extending from a light source to a viewer to allow each pixel to display a predetermined primary color. The color filter is disposed between the two polarizing plates to transmit only some of the wavelength bands of the incident light and to absorb other wavelength band, thereby achieving a primary color.

SUMMARY

A liquid crystal display device may be improved by improving the quality of the primary color displayed thereby.

Embodiments of the invention are directed to a display device in which a substrate is effectively prevented from being bent due to stress acting on the substrate.

Embodiments of the invention are directed to a method for manufacturing the display device.

According to an embodiment of the invention, a display device includes a first substrate, a wavelength conversion layer disposed on the first substrate, an inorganic film disposed on the wavelength conversion layer, a flattening film disposed on the inorganic film, and a first polarizing layer disposed on the flattening film. In such an embodiment, a difference between a coefficient of thermal expansion of the flattening film and a coefficient of thermal expansion of the inorganic film is about 50 parts per million per degree Kelvin (ppm/K) or less.

In an embodiment, the wavelength conversion layer may include quantum dots.

In an embodiment, a thickness of the wavelength conversion layer may be in a range from about 5 micrometers (μm) to about 7 μm.

In an embodiment, a thickness of the flattening film may be in a range of about 6 μm to about 10 μm.

In an embodiment, the flattening film may include polyimide.

In an embodiment, the coefficient of thermal expansion of the flattening film may be in a range of about 5 ppm/K to about 35 ppm/K.

In an embodiment, the difference between the coefficient of thermal expansion of the flattening film and the coefficient of thermal expansion of the inorganic film may be in a range of about 1.7 ppm/K to about 32.9 ppm/K.

In an embodiment, the flattening film may further include diamine.

In an embodiment, the diamine may be in an amount of 20 to 80 parts by weight with respect to 100 parts by weight of the polyimide.

In an embodiment, the inorganic film may reflect green light and red light, and transmit blue light.

In an embodiment, the first polarizing layer may include a wire grid polarizer.

In an embodiment, the display device may further include a backlight unit which emits blue light and provides the blue light to the wavelength conversion layer.

In an embodiment, the display device may further include a light transmitting layer disposed to be adjacent to the wavelength conversion layer.

In an embodiment, the wavelength conversion layer may be provided in plural, and the wavelength conversion layers may have different heights from each other.

According to another embodiment of the invention, a method of manufacturing a display device includes preparing a first substrate on which a wavelength conversion layer is provided, providing an inorganic film on the wavelength conversion layer, providing a flattening film on the inorganic film, and providing a first polarizing layer on the flattening film, where a difference between a coefficient of thermal expansion of the flattening film and a coefficient of thermal expansion of the inorganic film is about 50 ppm/K or less.

In an embodiment, the wavelength conversion layer may include quantum dots.

In an embodiment, a thickness of the wavelength conversion layer may be in a range of about 5 μm to about 7 μm.

In an embodiment, a thickness of the flattening film may be in a range of about 6 μm to about 10 μm.

In an embodiment, the flattening film may include polyimide.

In an embodiment, the difference between the coefficient of thermal expansion of the flattening film and the coefficient of thermal expansion of the inorganic film may be in a range of about 1.7 ppm/K to about 32.9 ppm/K.

According to embodiments of the invention, the substrate may be effectively prevented from being bent due to stress acting on the substrate during a process.

BRIEF DESCRIPTION OF THE DRAWINGS

The above and other features of the invention will become more apparent by describing in detail exemplary embodiments thereof with reference to the attached drawings, in which.

DETAILED DESCRIPTION

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

Figure 1:
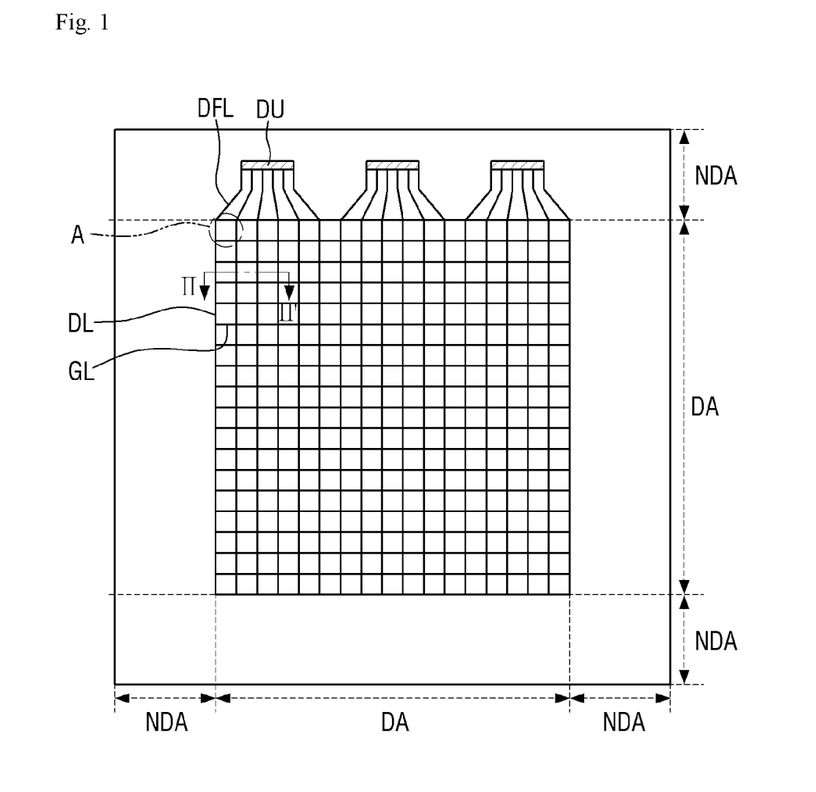
FIG. 1 is a schematic plan view of a liquid crystal display device according to an embodiment of the invention.
Figure 2:
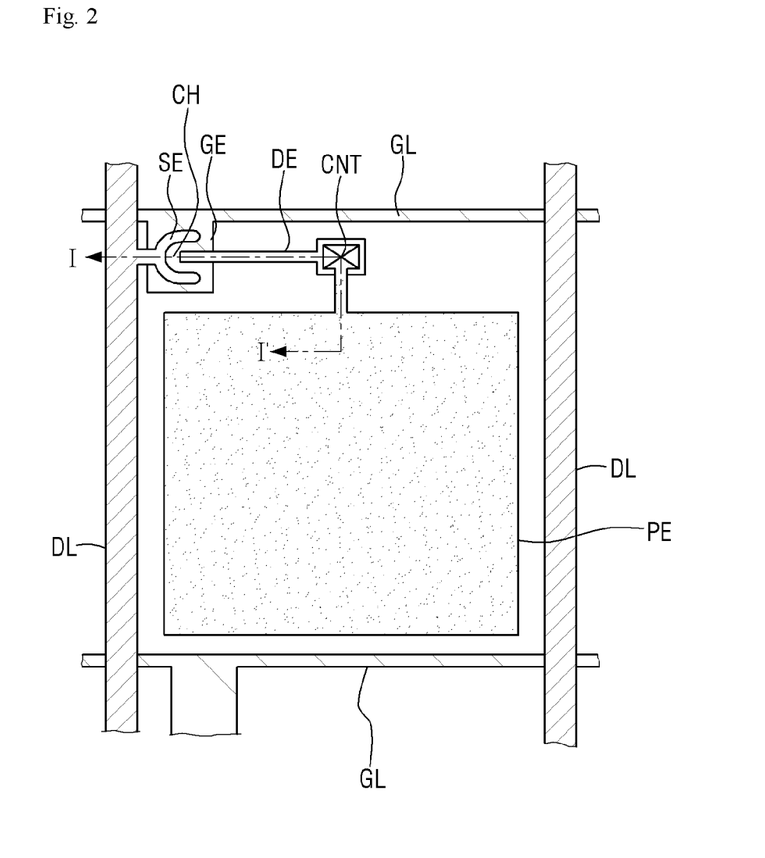
FIG. 2 is an enlarged view of a region A of FIG. 1.

FIG. 1 is a schematic plan view of a liquid crystal display device according to an embodiment of the invention. FIG. 2 is an enlarged view of a region A of FIG. 1.

Figure 3:
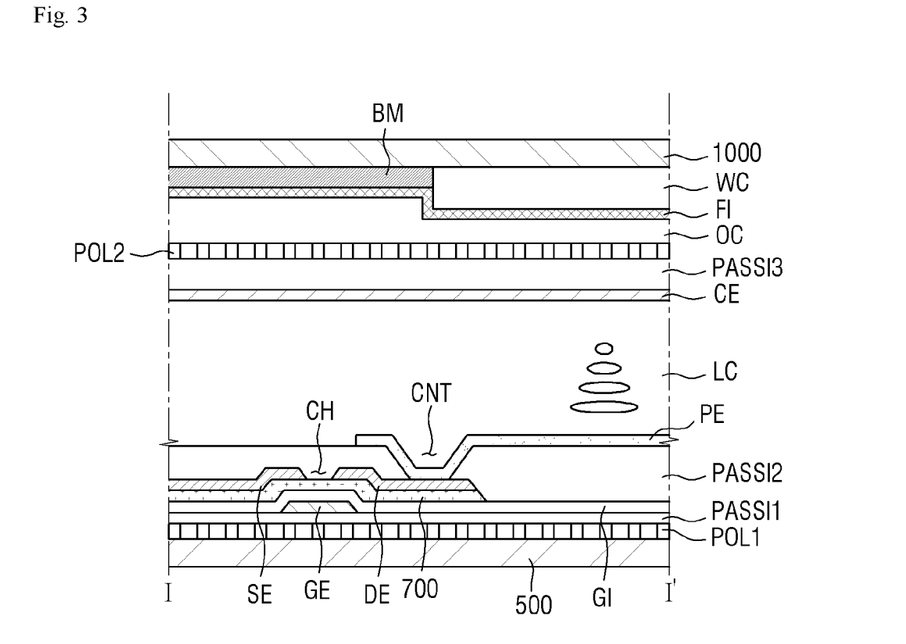
FIG. 3 is a cross-sectional view taken along line I-I of FIG. 2.
Figure 4:
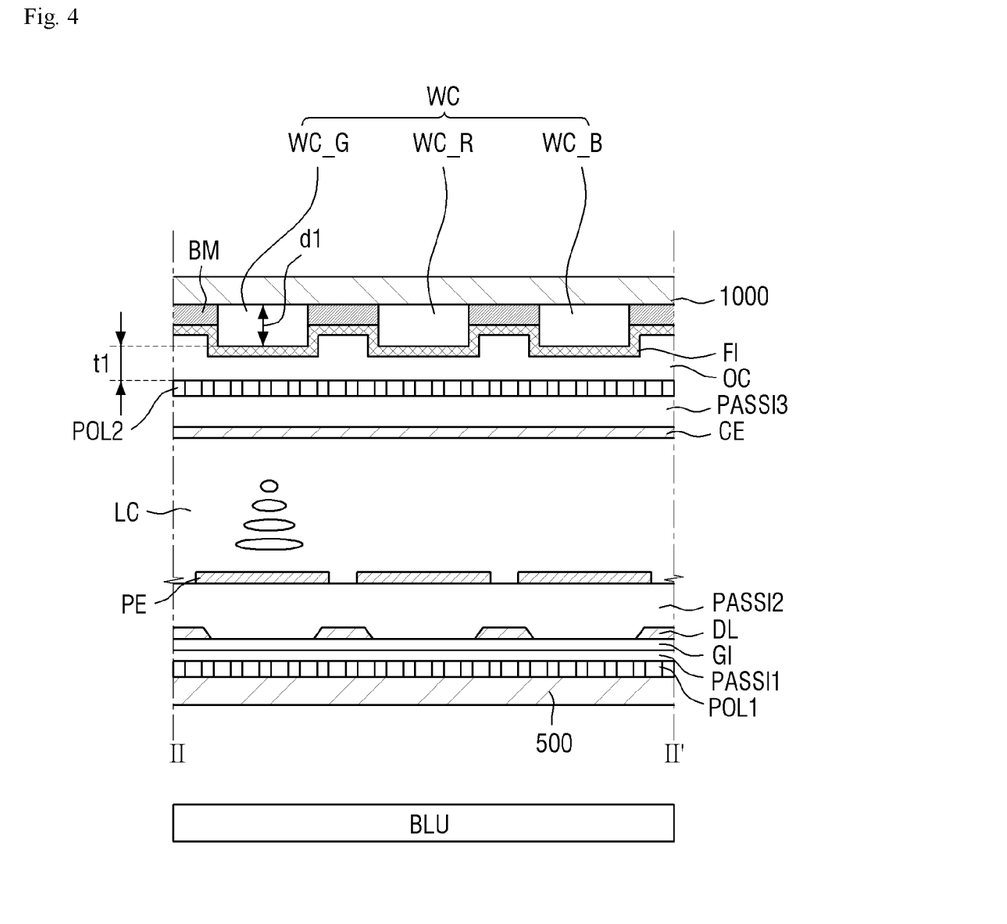
FIG. 4 is a cross-sectional view taken along line II-II of FIG. 1.

FIG. 3 is a cross-sectional view taken along line I-I of FIG. 2. FIG. 4 is a cross-sectional view taken along line II-II of FIG. 1.

Referring to FIGS. 1 to 4, an embodiment of a display device includes a first substrate 1000, a wavelength conversion layer WC disposed on the first substrate 1000, an inorganic film FI disposed on the conversion layer WC, a flattening film OC disposed on the inorganic film FI, and a first polarizing layer POL2 disposed on the flattening film OC.

The first substrate 1000 may include or be formed of a material having high heat resistance and transparency. The first substrate 1000 may include or be formed of, for example, transparent glass or plastic, but is not limited thereto. In such an embodiment, the display device may include a second substrate 500 opposite to the first substrate 1000.

Hereinafter, the second substrate 500 will be described in detail.

The display area DA and a non-display area NDA may be defined on the second substrate 500.

The display area DA is an area in which an image is displayed on the display device, and the non-display area NDA is an area in which various signal lines are disposed to allow an image to be displayed in the display area DA.

When viewed from a plan view, as shown in FIG. 1, a plurality of data drivers DU which provides data signals to the data line DL, and a plurality of data fan-out lines DFL which transmits signals provided from the data drivers DU to the data lines DL may be disposed on the non-display area NDA.

In an embodiment, a plurality of pixels may be disposed on the display area DA, and the plurality of data lines DL and the plurality of gate lines GL may be disposed on the display area to intersect with each other to be connected to the pixels. FIG. 2 is an enlarged view of one of a plurality of pixels (part 'A' of FIG. 1), and the display area DA may include a plurality of pixels, each having a substantially the same structure as each other.

Referring to FIG. 3, a second polarizing layer POL1 may be disposed on the second substrate 500. The second polarizing layer POL1 may polarize light provided from a backlight unit BLU which will be described later. In an embodiment, the second polarizing layer POL1 may transmit only light that vibrates in a specific direction, among the light provided from the backlight unit BLU, and may absorb or reflect the remaining light.

In an embodiment, the second polarizing layer POL1 may be a polarizing film to which a polymer resin stretched in a specific direction and a light absorbing material for absorbing light vibrating in a specific direction are adsorbed. In an alternative embodiment, the second polarizing layer POL1 includes a metal layer, and may absorb or reflect some of the light and may transmit some of the light. In another alternative embodiment, the second polarizing layer POL1 may be a polarizing layer including a wire grid polarizer. This will be described later in greater detail.

A first passivation film PASSI1 may be disposed on the second polarizing layer POL1. The first passivation film PASSI1 may include an inorganic insulating material. In one embodiment, for example, the first passivation film PASSI1 may include or be made of silicon oxide, silicon nitride, silicon oxynitride, aluminum oxynitride, titanium oxynitride, zirconium oxynitride, hafnium oxynitride, tantalum oxynitride, tungsten oxynitride or the like. However, these elements are merely exemplary, and the material of the first passivation film PASSI1 is not limited thereto.

The gate wiring (GL, GE) may be disposed on the first passivation film PASSI1. The gate wiring (GL, GE) may include a gate line GL which receives a signal for driving, and a gate electrode GE which protrudes from the gate line GL in the form of a protrusion. The gate line GL may extend in a first direction. The first direction may be substantially the same as, for example, a horizontal direction of FIG. 2. The gate electrode GE, a source electrode SE and a drain electrode DE to be described later may define three terminals of the thin film transistor, respectively.

The gate wiring (GL, GE) may include at least one of an aluminium (Al)-based metal including an aluminum alloy, a silver (Ag)-based metal including a silver alloy, a copper (Cu)-based metal including a copper alloy, a molybdenum (Mo)-based metal including a molybdenum alloy, chromium (Cr), titanium (Ti), and tantalum (Ta). However, these elements are merely exemplary, and the material of the gate wiring (GL, GE) is not limited thereto. In such an embodiment, a metal or a polymeric material having the performance desired for achieving a display device may be used as a material of the gate wiring (GL, GE).

The gate wiring (GL, GE) may have a single film structure, but are not limited thereto. Alternatively, the gate wiring (GL, GE) may include a double film, a triple film or multiple films.

A gate insulating film GI may be disposed on the gate wiring (GL, GE). The gate insulating film GI may be disposed on the first passivation film PASSI1 to cover the gate wiring (GL, GE) and may be over an entire surface of the second substrate 500.

The gate insulating film GI may include or be formed of at least one selected from an inorganic insulating material such as silicon oxide (SiOx) and silicon nitride (SiNx), and an organic insulating material such as benzocyclo butene ("BCB"), an acrylic material and polyimide, or may be formed by mixing one or more materials thereof. However, these elements are merely exemplary, and the material of the gate insulating film GI is not limited thereto.

A semiconductor pattern layer 700 may be disposed on the gate insulating film GI.

The semiconductor pattern layer 700 may include amorphous silicon or polycrystalline silicon. However, the invention is not limited thereto. Alternatively, the semiconductor pattern layer 700 may include an oxide semiconductor.

The semiconductor pattern layer 700 may have at least one of various shapes such as an island shape, a linear shape and the like. In an embodiment, where the semiconductor pattern layer 700 has a linear shape, the semiconductor pattern layer 700 may be located under the data line DL and may extend to the upper portion of the gate electrode GE.

In an embodiment, the semiconductor pattern layer 700 may be patterned in substantially the same shape as data wiring (DL, SE, DE) to be described later in the entire area except for the channel portion CH.

In such an embodiment, the semiconductor pattern layer 700 may be disposed to overlap the data wiring (DL, SE, DE) in all area except for the channel portion CH.

The channel portion CH may be disposed between the source electrode SE and the drain electrode DE facing each other. The channel portion CH plays a role of electrically connecting the source electrode SE and the drain electrode DE, and the shape thereof is not limited.

An ohmic contact layer (not illustrated), in which an n-type impurity is doped at a high concentration, may be disposed on the semiconductor pattern layer 700. The ohmic contact layer may overlap all or a part of the semiconductor pattern layer 700. However, in an embodiment where the semiconductor pattern layer 700 contains an oxide semiconductor, the ohmic contact layer may be omitted.

In an embodiment, where the semiconductor pattern layer 700 is an oxide semiconductor, the semiconductor pattern layer 700 may include zinc oxide (ZnO). In such an embodiment, at least one ion selected from gallium (Ga), indium (In), tin (Sn), zirconium (Zr), hafnium (Hf), cadmium (Cd), silver (Ag), copper (Cu), germanium (GE), gadolinium (Gd), titanium (Ti) and vanadium (V) may be doped on the semiconductor pattern layer 700. In an embodiment, the semiconductor pattern layer 700, which is an oxide semiconductor, may include at least one of ZnO, ZnGaO, ZnInO, ZnSnO, GaInZnO, CdO, InO, GaO, SnO, AgO, CuO, GeO, GdO, HfO, TiZnO, InGaZnO and InTiZnO. However, these elements are merely exemplary, and the type of the oxide semiconductor is not limited thereto.

The data wiring (DL, SE, DE) may be disposed on the semiconductor pattern layer 700. The data wiring (DL, SE, DE) include a data line DL, a source electrode SE and a drain electrode DE.

The data line DL may extend in a second direction, for example, a vertical direction in FIG. 2, and may intersect with the gate line GL. The source electrode SE may diverge from the data line DL in a branch shape and may be disposed to extend to an upper surface of the semiconductor pattern layer 700.

The drain electrode DE is spaced apart from the source electrode SE and may face the source electrode SE over the semiconductor pattern layer 700 around the gate electrode GE or the channel portion CH. The drain electrode DE may be electrically connected by being in contact with a pixel electrode PE to be described later.

The data wiring (DL, SE, DE) may have a single film structure or a multi film structure, and the data wiring (DL, SE, DE) may include or made of nickel (Ni), cobalt (Co), titanium (Ti), silver (Ag), copper (Cu), molybdenum (Mo), aluminum (Al), beryllium (Be), niobium (Nb), gold (Au), iron (Fe), selenium (SE), tantalum (Ta) or the like. In an embodiment, an alloy including at least one selected from titanium (Ti), zirconium (Zr), tungsten (W), tantalum (Ta), niobium (Nb), platinum (Pt), hafnium (Hf), oxygen (O) and nitrogen (N). However, the above-mentioned materials are merely exemplary, and the material of the data wiring (DL, SE, DE) is not limited thereto.

FIG. 2 illustrates an embodiment where a single thin film transistor is disposed in a pixel, but the scope of the invention is not limited thereto. In an alternative embodiment, the number of thin film transistors arranged in each pixel may be plural. In an embodiment where a plurality of thin film transistors is arranged in each pixel, each pixel may be divided into a plurality of domains to correspond to the respective thin film transistors.

A second passivation film PASSI2 may be disposed on the data wiring (DL, SE, DE) and the semiconductor pattern layer 700. The second passivation film PASSI2 may include or be made of an inorganic insulating material or an organic insulating material.

A contact hole CNT which exposes at least a part of the drain electrode DE may be defined through the second passivation film PASSI2.

A pixel electrode PE may be disposed on the second passivation film PASSI2. The pixel electrode PE may be electrically connected to the drain electrode DE through the contact hole CNT.

In an embodiment, the pixel electrode PE may include or be formed of a transparent conductor such as indium tin oxide ("ITO") or indium zinc oxide ("IZO") or a reflective conductor such as aluminum.

FIG. 2 illustrates an embodiment where the pixel electrode PE has a flat plate shape, but the shape of the pixel electrode is not limited thereto. In an alternative embodiment, the pixel electrode may have a structure having one or more slits. In another alternative embodiment, a plurality of pixel electrodes may be disposed in each pixel, and different voltages may be applied to the plurality of pixel electrodes, respectively.

Referring to FIG. 4, a backlight unit BLU may be disposed under the second substrate 500. The backlight unit BLU may provide light to the display device. The backlight unit BLU may be an edge type backlight unit in which a light source is disposed on a side surface or a direct type backlight unit in which a light source is disposed on a top surface.

In an embodiment, a light source of the backlight unit BLU may be a light source which emits light of an ultraviolet wavelength band.

In an exemplary embodiment in which the wavelength conversion layer WC includes the quantum dots, the backlight unit BLU may emit light of a blue wavelength band.

In an embodiment, as described above, the first substrate 1000 may be disposed to face the second substrate 500.

Referring to FIGS. 3 and 4, a black matrix BM and a plurality of wavelength conversion layers WC may be disposed on the first substrate 1000.

The black matrix BM may extend in the first direction to overlap the gate line GL, or may extend in the second direction to overlap the data line DL.

In such an embodiment, the black matrix BM may overlap the thin film transistor.

The black matrix BM may serve to block light incident from an outside or to prevent light spreading from the inside. In such an embodiment, the black matrix may include or be formed of a photosensitive resin including a black pigment. However, this is merely exemplary, and the material of the black matrix is not limited thereto. In such an embodiment, any material having physical properties for effectively blocking light incident from the outside may be used as the material of the black matrix.

The wavelength conversion layer WC may be disposed in a portion which is not covered with the black matrix BM, that is, a portion exposed by the black matrix BM. The wavelength conversion layer WC may convert the wavelength of light which has passed through the liquid crystal layer LC and the first polarizing layer POL2 to be described later. In an embodiment, the wavelength conversion layer WC may convert the wavelength of the light that has passed through the liquid crystal layer LC and the first polarizing layer POL2, such that the light passing through the wavelength conversion layer WC has a specific color.

This will be described in greater detail referring to FIG. 4. In an embodiment, the wavelength conversion layer WC may include a green wavelength conversion layer WC_G that converts light passing through the wavelength conversion layer WC to a green light, a red wavelength conversion layer WC_R that converts light passing through the wavelength conversion layer WC to a red light, and a blue wavelength conversion layer WC_B that converts light passing through the wavelength conversion layer WC to a blue light.

In an embodiment, the wavelength conversion layer WC may include green, red and blue color filters.

The plurality of wavelength conversion layers WC may be aligned and arranged along the first direction or the second direction perpendicular to the first direction. In an embodiment, the wavelength conversion layers may be disposed in a matrix form having a plurality of columns and a plurality of rows. In an embodiment in which a plurality of pixels are arranged in a matrix form having rows and columns, the plurality of wavelength conversion layers WC may be disposed to correspond to a plurality of pixels. In such an embodiment, at least one of the green, red, and blue wavelength conversion layers may be disposed to correspond to a pixel.

In an embodiment, the green wavelength conversion layer WC_G, the red wavelength conversion layer WC_R and the blue wavelength conversion layer WC_B may be disposed to be adjacent to each other.

The green wavelength conversion layer WC_G and the red wavelength conversion layer WC_R may be disposed to be spaced apart from each other at predetermined intervals. In an embodiment, the green wavelength conversion layer WC_G and the red wavelength conversion layer WC_R may be spaced apart from each other. In such an embodiment, the red wavelength conversion layer WC_R and the blue wavelength conversion layer WC_B may be spaced apart from each other. In such an embodiment, the red wavelength conversion layer WC_R and the blue wavelength conversion layer WC_B may be spaced apart from each other.

In an embodiment, the wavelength conversion layer WC may include the quantum dots. In an embodiment, the quantum dots included in the wavelength conversion layer WC may be group II-group VI based quantum dots including CdSe/ZnS, CdSe/CdS/ZnS, ZnSe/ZnS or ZnTe/ZnSe. In another embodiment, the quantum dots may be group III-group V based quantum dots including InP/ZnS or quantum dots including CuInS(2)/ZnS.

In an embodiment, where the wavelength conversion layer WC includes the quantum dots, the wavelength of light passing through the wavelength conversion layer WC may be varied depending on the size of quantum dots. In one embodiment, for example, each wavelength conversion layer WC may emit one of green light, red light or blue light, depending on the size of the quantum dots therein.

In an embodiment, where the wavelength conversion layer WC includes quantum dots, the thickness d1 of the wavelength conversion layer WC may be in a range of about 5 micrometers (μm) to about 7 μm. In an embodiment where the wavelength conversion layer WC includes the quantum dots, a step difference may occur due to the thickness of the wavelength conversion layer WC. In an embodiment, the flattening film OC may have a predetermined thickness to correspond to the thickness of the wavelength conversion layer WC, to compensate such a step different and to provide a flat surface to effectively support the first polarizing layer POL2 disposed thereon. The thickness of the flattening film OC will be described later in detail.

The black matrix BM may be disposed between the green wavelength conversion layer WC_G and the red wavelength conversion layer WC_B. In an embodiment, the black matrix BM may be disposed in a space between the green wavelength conversion layer WC_G and the red wavelength conversion layer WC_R. In such an embodiment, the black matrix BM may be disposed between the red wavelength conversion layer WC_R and the blue wavelength conversion layer WC_B.

In such an embodiment, the black matrix BM may be disposed between the wavelength conversion layers WC.

An inorganic film FI may be disposed on the plurality of wavelength conversion layers WC and the black matrix BM. In an embodiment, the inorganic film FI covers the black matrix BM and the wavelength conversion layer WC and may be disposed over an entire surface of the first substrate 1000.

The inorganic film FI may include or be made of silicon oxide (SiOx) and/or silicon nitride (SiNx).

FIG. 4 illustrates an embodiment where the inorganic film FI has a single layer structure, but the invention is not limited thereto. Alternatively, the inorganic film FI may have a laminated structure in which a plurality of layers is laminated one on another.

In an embodiment, the inorganic film FI may have a laminated structure in which silicon oxide (SiOx) and silicon nitride (SiNx) are alternately laminated at least once.

In an embodiment, the inorganic film FI may be a yellow filter. In such an embodiment, the inorganic film FI may be an optical filter that reflects green light and red light and transmits blue light. In such an embodiment, the light that has passed through the inorganic film FI may be blue light.

In an embodiment, the coefficient of thermal expansion of the inorganic film may be in a range of about 2.1 parts per million per degree Kelvin (ppm/K) to about 3.3 ppm/K.

A flattening film OC may be disposed on the inorganic film FI. The flattening film OC may include organic and/or inorganic insulating materials. The flattening film OC may be disposed over the entire area of the first substrate 1000, and may provide a flat surface by covering ab uneven surface due to thickness difference between the wavelength conversion layer WC and the black matrix BM on the first substrate 1000. FIG. 4 illustrates an embodiment where the flattening film OC is defined by a single film, but the invention is not limited thereto. In an alternative embodiment, the flattening film OC may have a multi-film structure including two or more films.

In an embodiment, the thickness of the flattening film OC may be defined as a distance (t1 in FIG. 4) from an upper surface (e.g., an inner surface) of the wavelength conversion layer WC to an upper surface (e.g., an inner surface) of the flattening film OC.

In an embodiment, the thickness of the flattening film OC may be in a range of about 6 μm to about 10 μm.

In an embodiment, the coefficient of thermal expansion of the flattening film OC may be about 53.3 ppm/K or less.

In such an embodiment, the difference between the coefficient of thermal expansion of the flattening film OC and the coefficient of thermal expansion of the inorganic film FI may be about 50 ppm/K or less.

When the difference in coefficient of thermal expansion between the flattening film OC and the inorganic film FI is large, e.g., greater than about 50 ppm/K, a substrate warpage phenomenon, that is, a substrate bending during a process, may occur. The substrate warpage phenomenon may occur when a tensile stress is applied to the flattening film OC due to a difference in thermal expansion coefficient.

In an embodiment, as described above, where the difference between the coefficient of thermal expansion of the flattening film OC and the coefficient of thermal expansion of the inorganic film FI is about 50 ppm/K or less, it is possible to suppress the substrate warpage phenomenon as described above.

In an embodiment, the flattening film OC may include polyimide.

In an embodiment where the flattening film OC includes polyimide, the coefficient of thermal expansion of the flattening film OC may be in a range of about 5 ppm/K to about 35 ppm/K.

In an embodiment, the coefficient of thermal expansion of the flattening film OC including polyimide may be adjusted by adding diamine to the flattening film OC.

Figure 11:
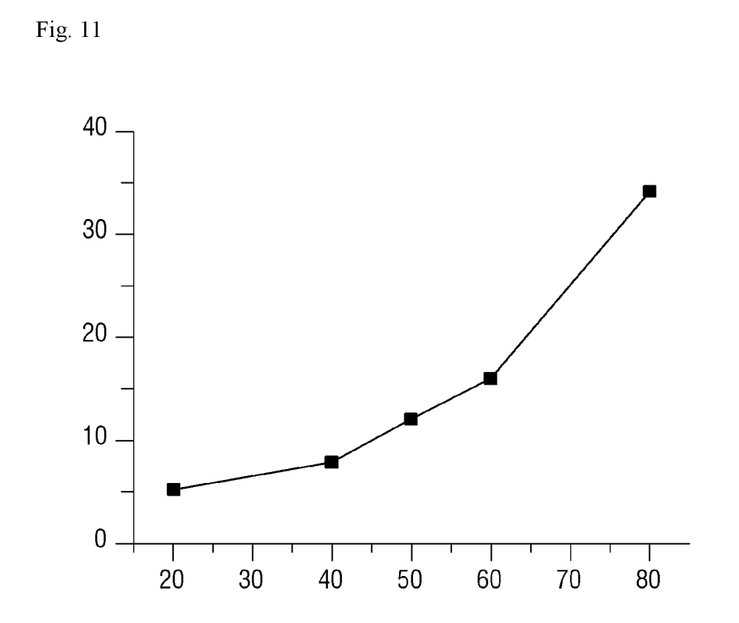
FIG. 11 is a graph for explaining a display device according to an embodiment of the invention.

In an embodiment, referring to FIG. 11, FIG. 11 illustrates a change in the polyimide coefficient of thermal expansion depending on the content of diamine.

A vertical axis of the graph refers to the part by weight of diamine with respect to 100 parts by weight of the polyimide, and a horizontal axis thereof refers to the coefficient of thermal expansion (ppm/K) of the flattening film OC.

Referring to the graph of FIG. 11, when the flattening film OC includes 20 parts by weight of diamine with respect to 100 parts by weight of the polyimide, the coefficient of thermal expansion of the flattening film OC is about 5 ppm/K, and the coefficient of thermal expansion of the flattening film OC is about 35 ppm/K when the flattening film OC includes 80 parts by weight of diamine with respect to 100 parts by weight of the polyimide.

Accordingly, when the diamine in an amount of 20 to 80 parts by weight is added to 100 parts by weight of the polyimide, the coefficient of thermal expansion of the flattening film OC may be in a range of about 5 ppm/K to about 35 ppm/K.

In such an embodiment, the difference in coefficient of thermal expansion between the flattening film OC and the inorganic film FI may be in a range of about 1.7 ppm/K to about 32.9 ppm/K.

The first polarizing layer POL2 may be disposed on the flattening film OC. The first polarizing layer POL2 may polarize the light which is provided from the backlight unit BLU and passes through the liquid crystal layer LC. In an embodiment, the first polarizing layer POL2 transmits only the light vibrating in a specific direction among the light passing through the liquid crystal layer LC, and may reflect the remaining light.

The vibration direction of the light transmitted by the first polarizing layer POL2 may be the same as or different from the vibration direction of the light transmitted by the second polarizing layer POL1. In one embodiment, for example, where the second polarizing layer POL1 transmits light vibrating in the first direction, the first polarizing layer POL2 may transmit light vibrating in the first direction, or may transmit light vibrating in a second direction (e.g., a direction perpendicular to the first direction) different from the first direction.

In an embodiment, the first polarizing layer POL2 may include a wire grid polarizer that linearly polarizes the reaching light.

In such an embodiment, the first polarizing layer POL2 may include fine metal wiring patterns arranged in parallel with each other along a predetermined direction. The fine metal wiring patterns may have a line width of about 60 nanometers (nm) or less, and may have a thickness of about 150 nm or less. However, the line width and the thickness are illustrative and may be varied depending on the design requirements. Of the light reaching the first polarizing layer POL2, only light incident to be parallel to the fine metal wiring pattern passes through the first polarizing layer POL2, and the first polarizing layer POL2 may perform the polarization function accordingly.

The first polarizing layer POL2 may include or be made of a metal having high reflectivity. In one embodiment, for example, the first polarizing layer POL2 may include at least one selected from aluminum, gold, silver, copper, chromium, iron, nickel and molybdenum. However, this is merely exemplary, and the material of the first polarizing layer POL2 is not limited thereto.

FIG. 4 illustrates an embodiment where the first polarizing layer POL2 is a single layer. However, in an alternative embodiment, the first polarizing layer POL2 may have a multi-layer structure including two or more layers.

A third passivation film PASSI3 may be disposed on the first polarizing layer POL2.

The common electrode CE may be disposed on the third passivation film PASSI3. The common electrode CE may be a front or flat electrode which is not patterned. A common voltage may be applied to the common electrode CE. When different voltages are applied to the common electrode CE and the pixel electrode PE, an electric field may be generated between the common electrode CE and the pixel electrode PE.

A liquid crystal layer LC, in which a plurality of liquid crystal molecules is disposed, may be disposed between the first substrate 1000 and the second substrate 500. The liquid crystal layer LC may be controlled by an electric field generated between the common electrode CE and the pixel electrode PE, and may control the light used to display the image by controlling the arrangement or movement of the liquid crystals disposed in the liquid crystal layer LC.

Hereinafter, a display device according to an alternative embodiment of the invention will be described. In the following embodiments, the same or like elements as those in embodiments described above are denoted by the same reference numerals, and any repetitive detailed description thereof will be omitted or simplified.

Figure 5:
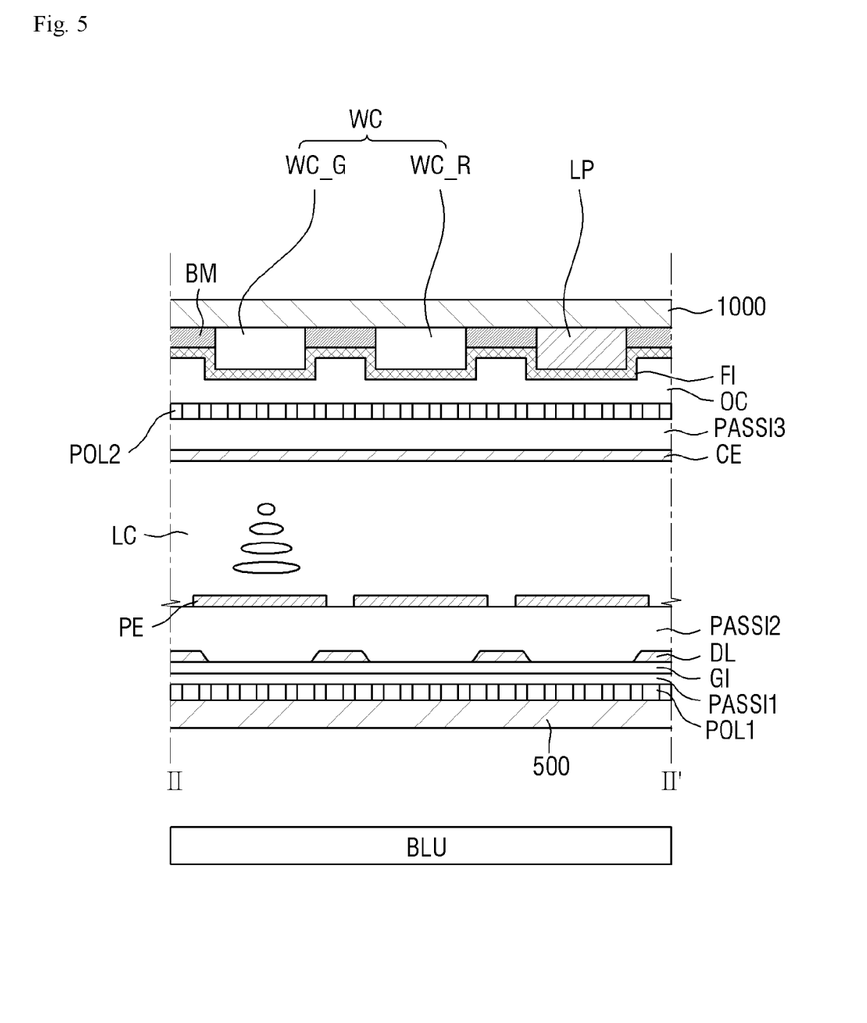
FIG. 5 is a cross-sectional view of a display device according to an alternative embodiment of the invention.

FIG. 5 is a cross-sectional view of a display device according to an alternative embodiment of the invention.

The display device shown in FIG. 5 is substantially the same as the display device shown in FIG. 4 except for a light transmission layer LP.

In an exemplary embodiment in which the backlight unit BLU includes blue light, the blue wavelength conversion layer WC_B may be replaced with a light transmission layer LP. The light transmission layer LP may include or be made of a transparent material and may allow blue light of wavelength provided from the backlight unit BLU to pass therethrough as it is. In such an embodiment, the wavelength of the light reaching the light transmission layer LP and the wavelength of the light passing through the light transmission layer LP may be substantially the same as each other. In such an embodiment, the light transmission layer LP may not convert the wavelength of the light passing therethrough. In such an embodiment, a pixel may display blue light even when the light transmission layer LP transmits light without wavelength conversion, because the light provided from the backlight unit BLU is in a blue wavelength band.

The light transmission layer LP may include or be made of a transparent metallic material. The light transmission layer LP may include, for example, $TiO_2$.

Figure 6:
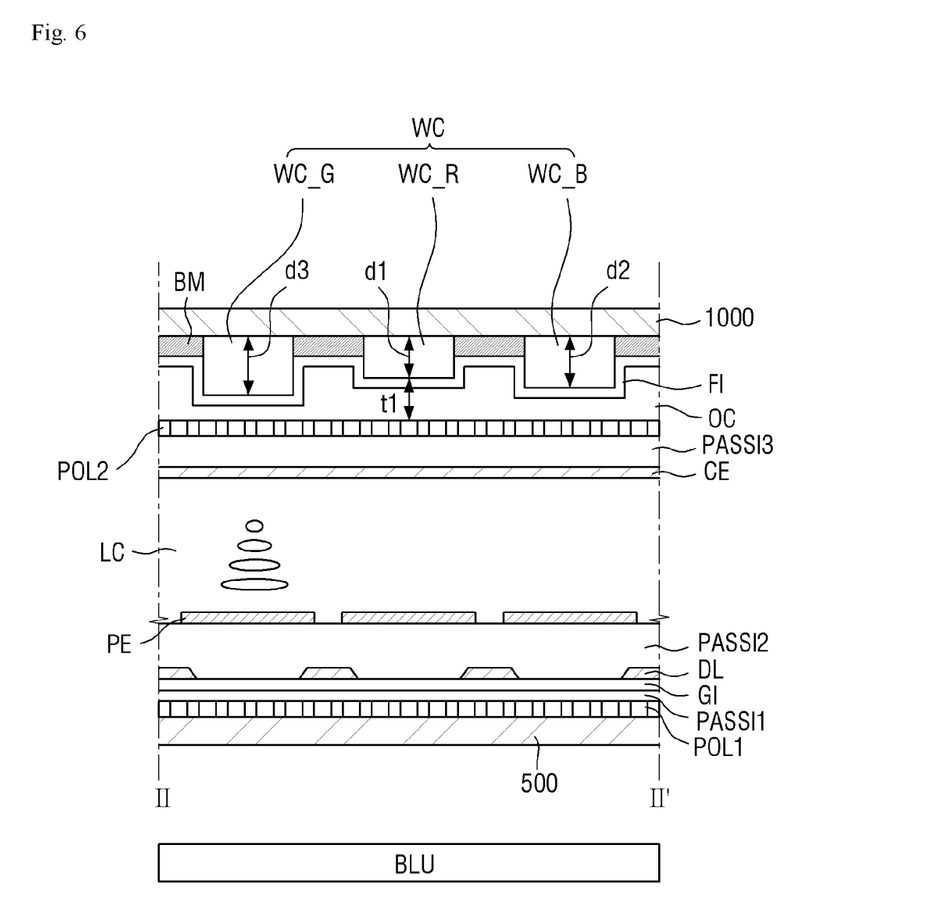
FIG. 6 is a cross-sectional view of a display device according to another alternative embodiment of the invention.

FIG. 6 is a cross-sectional view of a display device according to another alternative embodiment of the invention.

Referring to FIG. 6, in an embodiment of the display device, the plurality of wavelength conversion layers WC may have different heights from each other.

The heights of the plurality of wavelength conversion layers WC may be different from each other. In one embodiment, for example, as illustrated in FIG. 6, the height d3 of the green wavelength conversion layer WC_G, the height d1 of the red wavelength conversion layer WC_R and the height d2 of the blue wavelength conversion layer WC_B may be different from one another. In such an embodiment, the height d3 of the green wavelength conversion layer WC_G is the largest, and the height d1 of the red wavelength conversion layer WC_R may be the smallest.

In an embodiment, the height d1 of the lowest wavelength conversion layer WC_R may be in a range of about 5 μm to about 7 μm.

FIG. 6 illustrates an embodiment where the wavelength of the red wavelength conversion layer WC_R is the lowest, but the invention is not limited thereto. In other alternative embodiments, the height of the wavelength conversion layer having a different color from red may be the lowest.

Such a difference in height may be provided to ensure physical properties desired for the wavelength conversion layer WC to emit a specific wavelength. That is, such a difference in height may be attributed to adjusting the length through which light passes to emit light of a specific wavelength.

In an embodiment, the thickness of the flattening film OC may be defined as a distance from the upper surface of the lowest wavelength conversion layer WC, that is, the upper surface the red wavelength conversion layer WC_R, to the upper surface of the flattening film (t1 in FIG. 6)

In such an embodiment, the thickness of the flattening film OC may be in a range of about 6 μm to about 10 μm.

Figure 7:
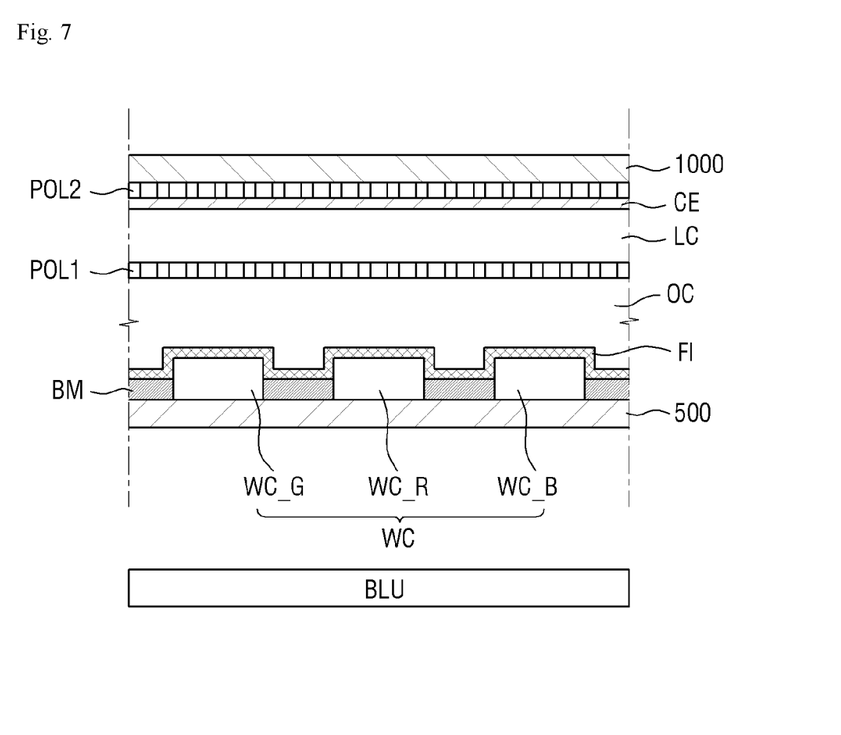
FIG. 7 is a cross-sectional view of a display device according to another alternative embodiment of the invention.

FIG. 7 is a cross-sectional view of a display device according to another alternative embodiment of the invention. The display device shown in FIG. 7 is substantially the same as the display device shown in FIG. 4 except that the wavelength conversion layer WC is disposed on the second substrate 500. Herein the second substrate 500 may be defined as a substrate close to the backlight unit BLU.

In an embodiment, the wavelength conversion layer WC may be disposed on the second substrate 500. In such an embodiment, the display device may be a display device which adopts a color filter on array ("COA") method.

Various electrodes such as a gate electrode, a data line and a pixel electrode may be disposed on the second substrate 500. The various electrodes may be disposed as illustrated in FIG. 4, but the arrangement of the electrodes is not limited thereto, and the various electrodes may be disposed in various ways. In FIG. 7, for convenience of illustration, the specific electrode arrangement will be omitted.

A wavelength conversion layer WC may be disposed on the second substrate 500. The wavelength conversion layer WC may include a green wavelength conversion layer WC_G, a red wavelength conversion layer WC_R and a blue wavelength conversion layer WC_B.

The plurality of wavelength conversion layers WC may be disposed to be spaced apart from each other. In such an embodiment, a space may exist between the adjacent wavelength conversion layers WC.

A black matrix BM may be disposed in the spaces between the wavelength conversion layers WC. The black matrix BM may be substantially the same as that described above with reference to FIG. 4.

The inorganic film FI and the flattening film OC may be disposed on the wavelength conversion layer WC. The inorganic film FI and the flattening film OC may be substantially the same as those in embodiments of the display device described above.

The second polarizing layer POL1 may be disposed on the flattening film OC.

A liquid crystal layer LC may be disposed on the flattening film OC, and the common electrode CE, the first polarizing layer POL2 and the first substrate 1000 may be disposed on the liquid crystal layer LC. Any repetitive detailed description of the same or like elements described above will hereinafter be omitted Hereinafter, a method of manufacturing a display device according to some embodiments of the invention will be described. The display device manufactured by an embodiment of a method is substantially the same as the embodiments of the display device described above. The same or like elements shown in FIGS. 8 to 10 have been labeled with the same reference characters as used above to describe the embodiments of the display device described above, and any repetitive detailed description thereof will hereinafter be omitted.

Figure 8:
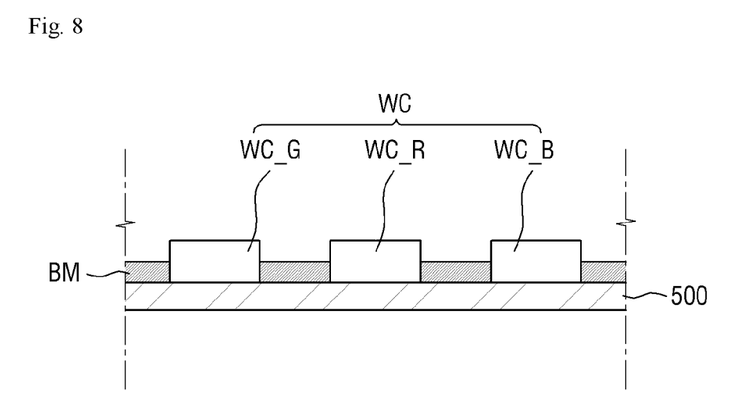
FIG. 8 is a cross-sectional view illustrating a method for manufacturing a display device according to an embodiment of the invention.
Figure 9:
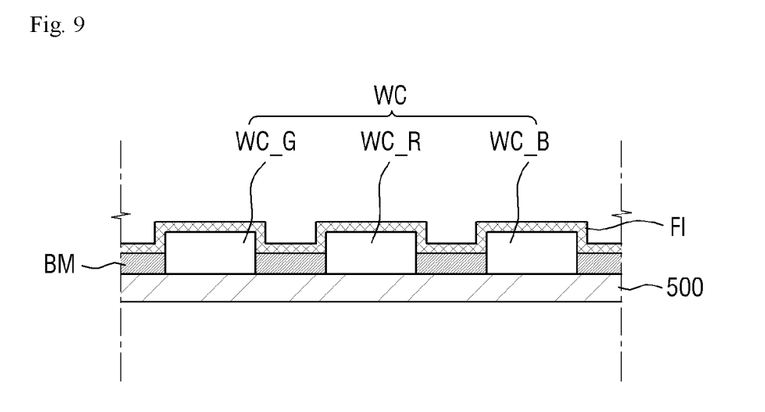
FIG. 9 is a cross-sectional view for explaining a method for manufacturing a display device according to an embodiment of the invention.
Figure 10:
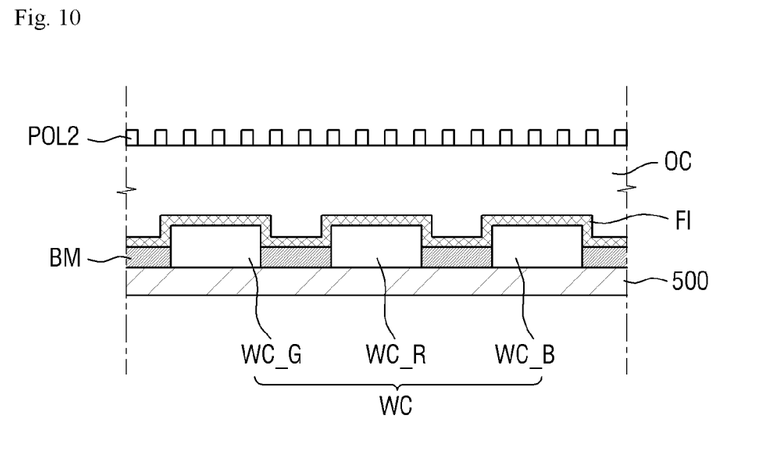
FIG. 10 is a cross-sectional view illustrating a method of manufacturing a display device according to an embodiment of the invention.

FIGS. 8 to 10 are cross-sectional views illustrating a method of manufacturing a display device according to an embodiment of the invention.

Referring to FIGS. 8 to 10, an embodiment of a method of manufacturing a display device includes preparing the first substrate 1000 on which a wavelength conversion layer WC is provided, providing an inorganic film FI on the conversion layer WC, providing a flattening film OC on the inorganic film FI, and providing a first polarizing layer POL2 on the flattening film OC.

First, referring to FIG. 8, a process of preparing a first substrate 1000 provided with a wavelength conversion layer WC is performed.

The black matrix BM disposed between the wavelength conversion layer WC and the wavelength conversion layer WC may be disposed on the first substrate 1000. The wavelength conversion layer WC and the black matrix BM may be substantially the same as those of embodiments of the display device described above.

Next, referring to FIG. 9, a process of providing an inorganic film FI on the wavelength conversion layer WC may be performed.

The formation of the inorganic film FI may be performed, using chemical vapor deposition ("CVD"), nozzle coating, spin coating or sputtering method. However, this is merely exemplary, and the scope of the invention is not limited to the method listed above.

The inorganic film FI may include or be made of silicon oxide (SiOx) and/or silicon nitride (SiNx).

FIG. 9 illustrates an embodiment where the inorganic film FI is a single layer, but the invention is not limited thereto. Alternatively, the inorganic film FI may have a laminated structure in which a plurality of layers is laminated.

In an embodiment, the inorganic film FI may have a laminated structure in which a silicon oxide (SiOx) layer and a silicon nitride (SiNx) layer are alternately laminated at least once.

In an embodiment, the inorganic film FI may be a yellow filter. In such an embodiment, the inorganic film FI may be an optical filter that reflects green and red and transmits blue. In such an embodiment, the light that has passed through the inorganic film FI may be blue light.

In an embodiment, the coefficient of thermal expansion of the inorganic film may be in a range of about 2.1 ppm/K to about 3.3 ppm/K.

In such an embodiment, the inorganic film FI may be substantially the same as that in the embodiments of the display device described above.

Next, referring to FIG. 10, a process of providing the flattening film OC on the inorganic film FI, and a process of providing the first polarizing layer POL2 on the flattening film OC may be performed.

The flattening film OC may be disposed on the inorganic film FI. The flattening film OC may include organic and/or inorganic insulating materials. The flattening film OC may be provided or formed over the entire area of the first substrate 1000, and may flatten a step difference on the first substrate 1000. FIG. 10 illustrates an embodiment where the flattening film OC is a single film, but the invention is not limited thereto. In an alternative embodiment, the flattening film OC may be formed to include two or more layers.

In an embodiment, the thickness of the flattening film OC may be in a range of about 6 μm to about 10 μm.

In an embodiment, the coefficient of thermal expansion of the flattening film OC may be about 53.3 ppm/K or less.

That is, in this case, the difference between the coefficient of thermal expansion of the flattening film OC and the coefficient of thermal expansion of the inorganic film FI may be about 50 ppm/K or less.

In an embodiment, the flattening film OC may include polyimide.

In an embodiment, where the flattening film OC includes polyimide, the coefficient of thermal expansion of the flattening film OC may be in a range of about 5 ppm/K to about 35 ppm/K.

In an embodiment, the coefficient of thermal expansion of the flattening film OC including polyimide may be adjusted by adding diamine to the flattening film OC.

In an embodiment, 20 to 80 parts by weight of diamine is added to 100 parts by weight of the polyimide, such that the coefficient of thermal expansion of the flattening film OC may be in a range of about 5 ppm/K to about 35 ppm/K.

In such an embodiment, the difference in coefficient of thermal expansion between the flattening film OC and the inorganic film FI may be in a range of about 1.7 ppm/K to about 32.9 ppm/K (see FIG. 11).

Next, a process of providing the first polarizing layer POL2 on the flattening film OC may be performed.

The first polarizing layer POL2 may be substantially the same as that in the embodiments of the display device described above.

In an embodiment, the first polarizing layer POL2 may include a wire grid polarizer. In an embodiment in which the first polarizing layer POL2 includes the wire grid polarizer, the first polarizing layer POL2 may be provided or formed in an imprinting manner or may be formed in a block copolymer manner. However, this is merely exemplary, and the method of forming the first polarizing layer POL2 is not limited thereto.

In an embodiment, a process of attaching the second substrate 500 facing the first substrate 1000 to the first substrate 1000 may be further performed.

While the invention has been particularly illustrated and described with reference to exemplary embodiments thereof, it will be understood by those of ordinary skill in the art that various changes in form and detail may be made therein without departing from the spirit and scope of the invention as defined by the following claims. The exemplary embodiments should be considered in a descriptive sense only and not for purposes of limitation.

What is claimed is:

1. A display device comprising:
   a first substrate;
   a wavelength conversion layer disposed on the first substrate;
   an inorganic film disposed on the wavelength conversion layer;
   a flattening film disposed on the inorganic film; and
   a first polarizing layer disposed on the flattening film,
   wherein a difference between a coefficient of thermal expansion of the flattening film and a coefficient of thermal expansion of the inorganic film is about 50 ppm/K or less.

2. The display device of claim 1, wherein the wavelength conversion layer comprises quantum dots.

3. The display device of claim 1, wherein a thickness of the wavelength conversion layer is in a range of about 5 μm to about 7 μm.

4. The display device of claim 3, wherein a thickness of the flattening film is in a range of about 6 μm to about 10 μm.

5. The display device of claim 1, wherein the flattening film comprises polyimide.

6. The display device of claim 5, wherein the coefficient of thermal expansion of the flattening film is in a range of about 5 ppm/K to about 35 ppm/K.

7. The display device of claim 1, wherein the difference between the coefficient of thermal expansion of the flattening film and the coefficient of thermal expansion of the inorganic film is in a range of about 1.7 ppm/K to about 32.9 ppm/K.

8. The display device of claim 7, wherein the flattening film further comprises diamine.

9. The display device of claim 8, wherein the diamine is in an amount of 20 to 80 parts by weight with respect to 100 parts by weight of the polyimide.

10. The display device of claim 1, wherein the inorganic film reflects green light and red light, and transmits blue light.

11. The display device of claim 1, wherein the first polarizing layer comprises a wire grid polarizer.

12. The display device of claim 1, further comprising:
   a backlight unit which emits blue light and provides the blue light to the wavelength conversion layer.

13. The display device of claim 12, further comprising:
   a light transmitting layer disposed to be adjacent to the wavelength conversion layer.

14. The display device of claim 1, wherein
   the wavelength conversion layer is provided in plural, and
   the wavelength conversion layers have different heights from each other.

15. A method of manufacturing a display device, the method comprising:
   preparing a first substrate on which a wavelength conversion layer is provided;
   providing an inorganic film on the first substrate to cover the wavelength conversion layer;
   providing a flattening film on the inorganic film; and
   providing a first polarizing layer on the flattening film.
   wherein a difference between a coefficient of thermal expansion of the flattening film and a coefficient of thermal expansion of the inorganic film is about 50 ppm/K or less.

16. The method of claim 15, wherein the wavelength conversion layer comprises quantum dots.

17. The method of claim 16, wherein a thickness of the wavelength conversion layer is in a range of about 5 μm to about 7 μm.

18. The method of claim 17, wherein a thickness of the flattening film is in a range of about 6 μm to about 10 μm.

19. The method of claim 15, wherein the flattening film comprises polyimide.

20. The method of claim 15, wherein the difference between the coefficient of thermal expansion of the flattening film and the coefficient of thermal expansion of the inorganic film is in a range of about 1.7 ppm/K to about 32.9 ppm/K.

* * * * *